United States Patent
Bergy et al.

[15] 3,699,223
[45] Oct. 17, 1972

[54] ENHYGROFUNGIN AND PROCESS FOR PREPARING THE SAME

[72] Inventors: Malcolm E. Bergy; Herman Hoeksema; LeRoy E. Johnson, all of Kalamazoo, Mich.

[73] Assignee: The Upjohn Company, Kalamazoo, Mich.

[22] Filed: June 13, 1969

[21] Appl. No.: 833,135

[52] U.S. Cl..................................................424/121
[51] Int. Cl..................................................A61k 21/00
[58] Field of Search.......................................424/121

[56] References Cited

UNITED STATES PATENTS 2,746,902  5/1956  Gottlieb et al.............424/115
3,118,812  1/1964  Gaeumann et al.........424/121

Primary Examiner—Albert T. Meyers
Assistant Examiner—Daren M. Stephens
Attorney—Roman Saliwanchik and John Kekich

[57] ABSTRACT

Antibiotic enhygrofungin producible by culturing *Streptomyces hygroscopicus* var. *enhygrus* var. nova in an aqueous nutrient medium. Enhygrofungin inhibits the growth of various fungi. For example, it is active against *Cryptococcus neoformans* and can be used to treat pigeon roosts to inhibit this fungus which has been found in pigeon droppings.

7 Claims, 3 Drawing Figures

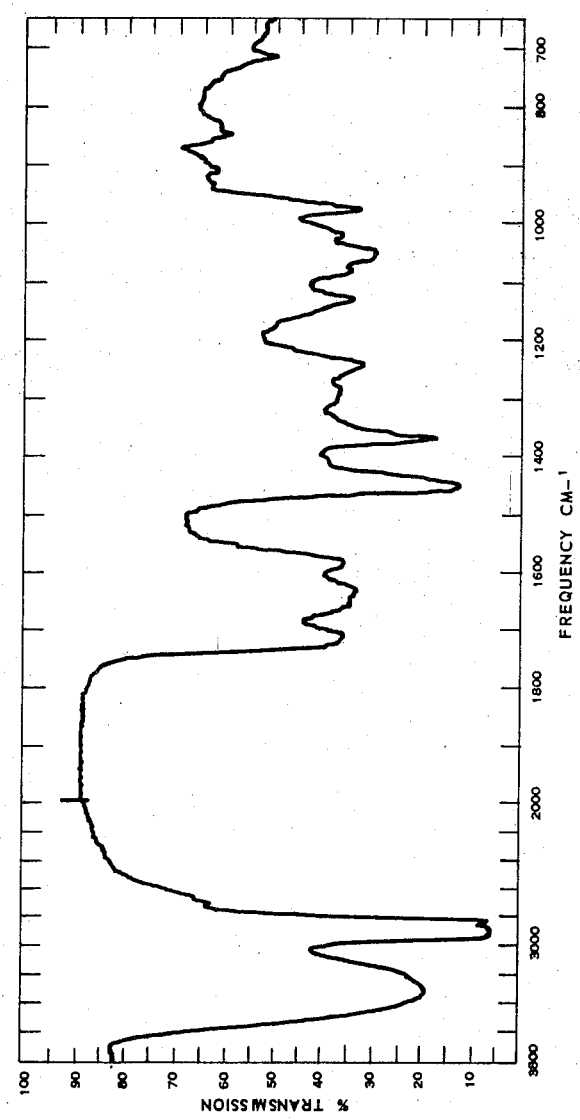

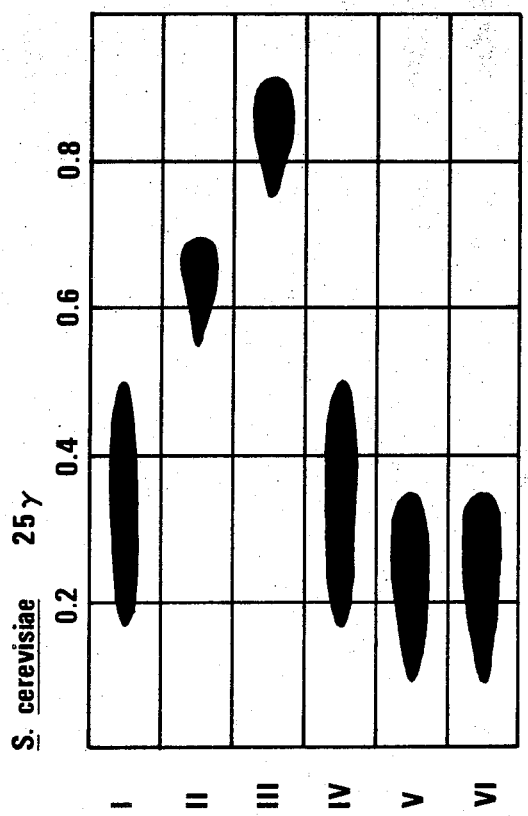

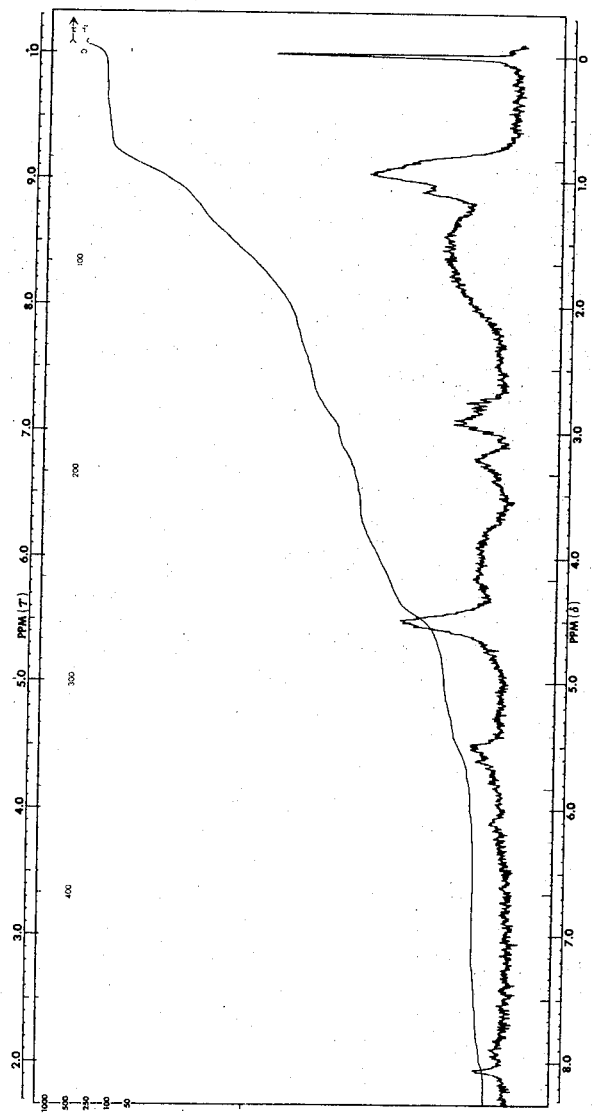
FIGURE 3 — PROTON MAGNETIC RESONANCE SPECTRUM
MALCOLM E. BERGY
HERMAN HOEKSEMA
LEROY E. JOHNSON
INVENTORS
ATTORNEY

ENHYGROFUNGIN AND PROCESS FOR PREPARING THE SAME

BRIEF SUMMARY OF THE INVENTION

Enhygrofungin (U–29,479) is an amphoteric non-polyenic chemical compound which is producible by culturing an enhygrofungin-producing actinomycete in an aqueous nutrient medium. It has the property of adversely affecting the growth of Grampositive bacteria, for example, *Staphylococcus aureus, Streptococcus hemolyticus, Streptococcus faecalis, Bacillus subtilis,* and *Diplococcus pneumoniae*. Also, enhygrofungin has good antifungal activity against various fungi, for example, *Blastomyces dermatitidis, Coccidiodes immitis, Phialophora verrucosa, Cryptococcus neoformans,* and *Histoplasma capsulatum*. Accordingly, enhygrofungin can be used alone or in combination with other antibiotic agents to prevent the growth of or reduce the number of bacteria and fungi, as disclosed above, in various environments. For example, it can be used as the anti-fungal agent in the shoe uppers disclosed in U.S. Pat. No. 3,130,505.

Enhygrofungin is considered to be a component of the known polyenic antibiotic complex endomycin. A process for the production of the endomycin complex, as well as its characterization is disclosed in U.S. Pat. No. 2,746,902. Enhygrofungin, a non-polyenic compound, is not disclosed in U.S. Pat. No. 2,746,902 as being a component of the endomycin complex. Accordingly, there is no disclosure of the properties of enhygrofungin nor of the manner for isolating enhygrofungin from the endomycin complex. Though the endomycin complex is known in the antibiotic art as having good antifungal activity, it has not been used medically because a standardized preparation could not be made. Preparations of endomycin complex would vary depending on the amount of any particular component of the complex which was present. The inability to obtain a standardized preparation of the endomycin complex disclosed in U.S. Pat. No. 2,746,902, which could be usable for medical purposes, led to the work resulting in the discovery of the subject compound. In contrast to the non-crystalline polyenic endomycin complex, enhygrofungin is a crystalline non-polyenic entity which is highly reproducible, and, therefore, can be standardized for medical uses. The fermentation conditions, including the microorganism, described herein, are a distinct improvement over those described in U.S. Pat. No. 2,746,902 to produce larger amounts of enhygrofungin in the endomycin complex.

DETAILED DESCRIPTION OF THE INVENTION
CHARACTERIZATION OF ENHYGROFUNGIN

Crystalline enhygrofungin has the following chemical and physical properties:

Color: white
Elemental Analysis:
Found: C, 60.95; H, 9.00; N, 4.01; O, 16.46
Titration data: In glacial acetic acid with perchloric acid, equivalent weight = 1,268 (does not titrate in T-butanol with pyridine).
Optical Rotation: $[\alpha]_D^{25} = +20°$ (c, 0.5 percent in dimethyl-formamide).
Solubilities: Enhygrofungin is soluble at a level of less than 5 mg./ml. in water, acetone, ethyl acetate, methyl ethyl ketone, methylene chloride, chloroform, butanol, and ether. It is soluble at a concentration greater than 10 mg./ml. in methanol, ethanol, n-propanol, glacial acetic acid, acetone-water (3:2), and water saturated 1-butanol.

Melting point: 119.3° C.

U.V. Absorption Spectra:

| Methanol: | | Inflection at | 227 m$\mu$, a = 25.77 |
|---|---|---|---|
| | | max. at | 231 m$\mu$, a = 27.22 |
| | Slight | Inflection at | 240 m$\mu$, a = 17.74 |
| 0.1 N HCl in methanol: | | Inflection at | 226 m$\mu$, a = 25.96 |
| | | max. at | 231 m$\mu$, a = 27.34 |
| | Slight | inflection at | 240 m$\mu$, a = 17.97 |
| 0.1 N KOH in methanol; | | Inflection at | 227 m$\mu$, a = 25.70 |
| | | max. at | 231 m$\mu$, a = 27.17 |
| | Slight | inflection at | 240 m$\mu$, a = 18.02 |

Infrared Spectrum: The infrared absorption spectrum of enhygrofungin suspended in mineral oil mull is reproduced in FIG. 1 of the drawing. Enhygrofungin shows peaks at the following wavelength expressed in reciprocal centimeters:

| | | |
|---|---|---|
| 3340 (S) | 1375 (S) (oil) | 892 (S) |
| 2950 (S) (oil) | 1295 (M) | 940 (W) |
| 2845 (S) (oil) | 1250 (M) | 917 (W) |
| 1720 (S) | 1135 (S) | 865 (W) |
| 1660 (S) | 1087 (S) | 855 (W) |
| 1640 (S) | 1063 (S) | 840 (W) |
| 1590 (S) | 1055 (S) | 718 (W) (oil) |
| 1460 (S) (oil) | 1027 (M) | |

The infrared absorption spectrum of enhygrogungin in KBr from chloroform shows peaks at the following wavelengths expressed in reciprocal centimeters:

| | | |
|---|---|---|
| 3370 (S) | 1640 (S) | 1135 (S) |
| 3200 (S) | 1595 (S) | 1085 (S) |
| 2980 (S) | 1455 (S) | 1060 (S) |
| 2930 (S) | 1415 (S) | 1025 (Sh) (S) |
| 2890 (S) | 1380 (S) | 985 (S) |
| 1715 (S) | 1275 (broad) (S) | 915 (M) |
| 1660 (S) | 1180 (M) | 845 (M) |

Infrared absorption band intensities throughout this disclosure are indicated as "S," "M," and "W, " respectively, and are approximated in terms of the backgrounds in the vicinity of the bands. An "S" band is of the same order of intensity as the strongest in the spectrum; "M" bands are between one-third and two-thirds as intense as the strongest band, and "W" bands are less than one-third as intense as the strongest band. These estimates are made on the basis of a percent transmission scale. Also, the designation "sh" appearing after a band reading denotes a "shoulder" type of band.

Papergram: The paper chromatographic pattern of enhygrofungin in the following solvent systems is as shown in FIG. 2 of the drawing:

1. 1-butanol, water (84:16), 16 hours.
2. 1-butanol, water (84:16) + 0.25 percent p-toluene-sulfonic acid, 16 hours.
3. 1-butanol, acetic acid, water (2:1:1), 16 hours,
4. 2 percent piperidine (v/v) in 1-butanol, water, (84:16), 16 hours.
5. 1-butanol, water (4:96), 5 hours.
6. 1-butanol, water (4:96), + 0.25 percent p-toluene-sulfonic acid, 64 hours.

The microorganism S. cerevisiae used in the papergram analysis was grown on agar consisting of the following nutrients:

| | gm./liter |
|---|---|
| Dextrose | 10.0 |
| Yeast extract | 2.5 |
| KH₂PO₄ | 1.0 |
| Agar | 17.5 |
| pH | 5.65 ± .1 |

Nuclear Magnetic Resonance (NMR): (also known as Proton Magnetic Resonance)

Enhygrofungin has a characteristic NMR spectrum as shown in FIG. 3 of the accompanying drawing. The NMR spectrum was observed on a Varian A-60 sprectrometer on a solution (ca. 0.5 ml., ca. 15 percent concentration) of the sample of enhygrofungin in deuterated dimethylformamide. The spectrum was calibrated against internal tetramethylsilane and the precision of the Δ v was > ± 1 c.p.s. Frequencies were recorded in c.p.s. downfield from tetramethylsilane.

The Antibacterial Properties of Enhygrofungin:

Enhygrofungin has antibacterial activity as shown in the following table. The test is a two-fold broth dilution test in brain heart infusion broth wherein a final dilution of a fully grown culture in brain heart infusion of 1/40,000 is made. Those organisms requiring blood are cultured in this but the final antibiotic test is made in the absence of blood, since it has been found that adequate growth is obtained without it. Incubation is unshaken at 37° C. End points read at 20 hours.

Brain heart infusion broth (Difco) has the following composition:

| Calf brains, infusion from | 200 g. |
|---|---|
| Beef heart, infusion from | 250 g. |
| Proteose Peptone, Difco | 10 g. |
| Bacto-dextrose | 2 g. |
| Sodium chloride | 5 g. |
| Disodium Phosphate | 2.5 g. |
| Water | 1000 ml. |

| Test Organism | Minimum Inhibitory Concentration (mcg./ml.) |
|---|---|
| Staphylococcus aureus | 8.0 |
| *Streptococcus hemolyticus | 31.0 |
| Streptococcus faecalis | 31.0 |
| Bacillus subtilis | 4.0 |
| *Diplococcus pneumoniae | 16.0 |

*Requires blood for growth

Enhygrofungin is active against the yeast *Saccharomyces pastorianus* on the above test at a concentration of less than 0.5 mcg./ml.

Antifungal Spectrum of Enhygrofungin:

Enhygrofungin has antifungal activity as shown in the following table. The antifungal spectrum was determined by an agar dilution plate assay.*

| Test Organism | Concentration of Enhygrofungin in mcg./ml. | | |
|---|---|---|---|
| | 10 | 1.0 | 0.1 |
| Nocardia asteroides | − | + | + |
| Blastomyces dermatitidis | − | − | ± |
| Coccidiodes immitis | − | − | ± |
| Geotrichum sp. | − | − | + |
| Hormodendrum compactum | − | − | ± |
| Phialophora verrucosa | − | − | ± |
| Cryptococcus neoformans | − | − | ± |
| Histoplasma capsulatum | − | − | − |
| Sporotrichum schenckii | − | ± | + |
| Monosporium apiospermum | − | ± | + |
| Trichophyton rubrum | − | − | ± |
| Trichophyton interdigitale | − | ± | ± |
| Candida albicans ABBOTT | − | ± | + |
| Trichophyton violaceum | − | − | + |
| Trichophyton mentagrophytes | − | − | + |
| Microsporum canis | − | ± | + |
| Trichophyton asteroides | − | − | + |

Note:
− = Inhibition
± = Partial Inhibition
+ = No Inhibition

*The test compound is incorporated in agar in Petri dishes at concentrations of 1000, 100, 10, 1, and 0.1 mcg./ml. Suspensions of fungi are streaked on the agar surface. Plain agar¹ controls are also streaked with the test organism. After incubation (72 hours at 28° C.) plates are examined and the degree of inhibition of growth of the test organisms is recorded. Results are reported in mcg./ml. to inhibit the test organisms.

¹Agar used consists of the following:
| Difco Bacto-dextrose | 10 g. |
|---|---|
| Difco Bacto-peptone | 5 g. |
| Difco yeast extract | 1 g. |
| Triple-distilled H₂O | to 1 liter |
| pH | 6.8 |
| Agar | 15 g. |

THE MICROORGANISM

The actinomycete used according to this invention for the production of enhygrofungin is *Streptomyces hygroscopicus* var. *enhygrus*. One of its strain characteristics is the production of enhygrofungin. A subculture of the living organism was deposited without restriction and can be obtained from the permanent collection of the Northern Utilization and Research Division, Agricultural Research Service, U.S. Department of Agriculture, Peoria, Illinois, U.S.A. Its accession number in this repository is NRRL 3664.

The microorganism of this invention was studied and characterized by Alma Dietz of The Upjohn Research Laboratories.

*Streptomyces hygroscopicus* var. *enhygrus* is a new soil isolate of the genus *Streptomyces* which has been found to differ in certain characteristics from the type culture *Streptomyces hygroscopicus* CBS (Centraalbureau voor Schimmel) notably in its production of the antibiotic enhygrofungin, and from the type culture *Streptomyces endus* NRRL 2339 (in its cultural characteristics). *Streptomyces endus* has been shown to have the main characteristics of the *hygroscopicus* type [Tresner, H. D., and E. J. Backus, Applied Microbiol. 4:243–250 (1956)], [Dietz, A., and J. Mathews, Applied Microbiol. 10:258–263 (1962)]. Minor distinguishing characteristics of the new variety may be noted by referring to the Tables following.

*Streptomyces hygroscopicus* var. *enhygrus* is compared with the type species *Streptomyces hygroscopicus*, (Jensen) Waksman, CBS, and the type species *Streptomyces endus* NRRL 2339.

Color characteristics.

Aerial growth white to gray-white or gray-cream to gray. Moist, black, hygroscopic patches on some media. Melanin-negative. Appearance on Ektachrome is given in Table 1. Reference color characteristics are given in Table 2. The cultures may be placed in the White (W) and Gray (GY) color series of Tresner and Backus [Applied Microbiol. 11:335–338 (1962)].

Microscopic characteristics.

Sporophores in tight spirals. Sporophores spiral in the sense of Pridham et al. [Applied Microbiol. 6:52–79 (1958)]. Spores frequently forming dark, hygroscopic patches. Spores smooth with an irregular possibly warty-surface by direct electron microscope examination. Spore surface morel-like when examined by the carbon replication method of Dietz and Mathews [Applied Microbiol. 10:258–263 (1962); Applied Microbiol. 16:935–941 (1968)].
Cultural characteristics.
See Table 3.
Carbon utilization.

The ability of the culture to grow on carbon compounds was determined in the synthetic medium of Pridham and Gottlieb [J. Bacteriol. 56: 107–114 (1948)][Shirling, E. B., and D. Gottlieb, International Journal of Systemic Bacteriology 16:313–340 (1966)]. See Tables 4 and 5.
Temperature.

All cultures grow moderately well to well at temperatures of 18°–27° C. on Bennett's, Czapek's Sucrose, and Maltose-tryptone agars. Trace to fair vegetative growth occurs in 24 hours at 55° C.

The characteristics of *Streptomyces hygroscopicus* var. *enhygrus* var. nova, NRRL 3664, are given in the following tables:

| Table 1 | Appearance of S. hygroscopicus cultures on Ektachrome |
|---|---|
| Table 2 | Reference Color Characteristics of S. hygroscopicus cultures |
| Table 3 | Cultural Characteristics of S. hygroscopicus cultures |
| Table 4 | Utilization of Carbon Compounds in the Synthetic Medium of Pridham and Gottlieb |
| Table 5 | Utilization of Carbon Compounds in the Modified Medium of Pridham and Gottlieb |

TABLE 1

Appearance of *S. hygroscopicus* cultures on Ektachrome*

| Agar Medium | | S. hygroscopicus var. enhygrus | S. hygroscopicus CBS | S. endus NRRL 2339 |
|---|---|---|---|---|
| Bennett's | S | Gray | Gray-white | Gray |
|  | R | Yellow-tan | Yellow | Tan |
| Czapek's sucrose | S | Gray | Gray | Gray white |
|  | R | Gray | Gray | Yellow-gray |
| Maltose-tryptone | S | Trace gray-white | Trace gray-white | Trace gray-white |
|  | R | Yellow | Yellow | Yellow |
| Peptone-iron | S | — | — | Trace gray-white |
|  | R | Yellow | Yellow | Yellow |
| 0.1% tyrosine | S | Trace gray-white | Trace gray-white | Trace gray-white |
|  | R | Red | Red | Pale cream |
|  | pink |  |  |  |
| Casein starch | S | Gray | Gray | White |
|  | R | Gray | Gray | Pale Yellow |

*Dietz, A., "Ektachrome Transparencies As Aids In Actinomycete Classification," Annals of the New York Acad. of Sciences, 60: 152–154, 1954.
S = Surface
R = Reverse

TABLE 2

[Reference color characteristics of *S. hygroscopicus* cultures]

| Agar medium | | Color harmony manual, 3rd ed. 1948 [1] | | | NBS circular 553, 1955 [2] | | |
|---|---|---|---|---|---|---|---|
| | | S. hygroscopicus var. enhygrus | S. hygroscopicus CBS | S. endus NRRL 2339 | S. hygroscopicus var. enhygrus | S. hygroscopicus CBS | S. endus NRRL 2339 |
| Bennett's | S | b* (m) | 1 fe (g) | 2 ig (m) | 263 m, 264 m | 112 m, 122 g | 110 g, 112 m |
|  | R | 2 gc (m) | 2 gc (g) | 2 ge (g) | 90 gm | 90 gm | 94 m, 109 gm |
|  | P |  | 2 ec (g) | 2 ie (g) |  | 90 gm | 91 gm, 94 g, 106 g |
| Czapek's sucrose | S | 2 fe (g) | 3 fe (m) | c (g) | 94 g, 112 gm | 63 gm | 264 gm |
|  | R | 2 dc (g) | 1 fe (m) | c (g) | 93 gm | 112 m, 122 g | 264 gm |
|  | P |  |  |  |  |  |  |
| Maltose-tryptone | S | b (m) | 2 cb (m) | 1 dc (g) | 263 m, 264 g | 92 m, 93 gm | 121 m |
|  | R | 1 ca (g) | 2 ec (g) | 2 cb (g) | 104 g, 121 m | 90 gm | 92 m, 93 m |
|  | P |  |  |  |  |  |  |
| Yeast extract-malt extract (ISP-2) | S | 2 fe (g) | 1 dc (m) | 3 fe (m) | 94 g, 112 gm | 121 m, 122 g | 63 gm |
|  | R | 2 gc (g) | 2 gc (m) | 2 ie (m) | 90 gm | 90 gm | 91 gm, 94 g, 106 g |
|  | P | 1 ec (m) | 2 gc (g) | 2 gc (g) | 121 m, 122 g | 90 gm | 90 gm |
| Oatmeal (ISP-3) | S | 2 ml (m) | 2 fe (g) | 1 dc (m) | ———— | 94 g, 112 gm | 121 m, 122 g |
|  | R | 3 fe (g) | 2 dc (g) | 1½ gc (g) | 63 gm | 93 gm | 102 g, 105 g |
|  | P | 2 dc (g) | 1 dc (m) | 1 ca (g) | 93 gm | 121 m, 122 g | 104 g, 121 g |
| Inorganic-salts starch (ISP-4) | S | 3 fe (g) | 2 fe (g) | 1 cb (g) | 63 gm | 94 g, 112 gm | 121 gm |
|  | R | 2 cb (m) | 3 fe (g) | 2 gc (m) | 92 m, 93 gm | 63 gm | 90 gm |
|  | P | 1 cb (m) | 2 dc (g) | 1½ ec (m) | 121 gm | 93 gm | 90 gm, 93 m |
| Glycerol-asparagine (ISP-5) | S | 2 fe (m) | b (m) | 2 cg (m) | 94 g, 112 gm | 263 m, 264 g | 92 m, 93 gm |
|  | R | 2 gc (g) | 2 cb (m) | 1 ca (g) | 90 gm | 92 m, 93 gm | 104 g, 121 m |
|  | P |  |  |  |  |  |  |

S=Surface; R=Reverse; P=Pigment; (m)=matte; (g)=glossy.
[1] Jacobson, E., W. C. Granville, and C. E. Foss. 1948. Color harmony manual, 3rd ed. Container Corporation of America, Chicago, Illinois.
[2] Kelly, K. L., and D. B. Judd. 1955. The ISCC-NBS method of designating colors and a dictionary of color names. U.S. Dept. Comm. Circ. 553.
*See next page for color names.

Color Code for Table 2

| Color Harmony Manual, 3rd ed. 1948 Color Chip | Color Name | NBS Circular 553, 1955 Color Chip | Color Name |
|---|---|---|---|
| b | oyster white | 263m | white |
|  |  | 264g | light gray |
| c | light gray | 264gm | light gray |
| 1ca | pale yellow | 104g | pale greenish yellow |
|  |  | 121m | pale yellow green |
| 1cb | parchment | 121gm | pale yellow green |
| 1dc | putty, griege | 121m | pale yellow green |
|  |  | 122g | grayish yellow green |
| 1ec | light citron gray, putty | 121m | pale yellow green |
|  |  | 122g | grayish yellow green |
| 1fe | griege, citron gray | 112m | light olive gray |
|  |  | 122g | grayish yellow green |
| 1½gc | dusty yellow | 102g | moderate greenish yellow |
|  |  | 105g | grayish greenish yellow |
| 1½ec | putty | 90gm | grayish yellow |
|  |  | 93m | yellowish gray |
| 2cb | ivory tint | 92m | yellowish white |
|  |  | 93gm | yellowish gray |
| 2dc | natural, string | 93gm | yellowish gray |
| 2ec | bicuit, ecru, oatmeal, sand | 90gm | grayish yellow |
| 2fe | covert gray | 94g | light olive brown |
|  |  | 112gm | light olive gray |
| 2gc | bamboo, chamois | 90gm | grayish yellow |
| 2ge | covert tan, griege | 94m | light olive brown |
|  |  | 109gm | light grayish olive |
| 2ie | light mustard tan | 91gm | dark grayish yellow |
|  |  | 94g | light olive brown |
|  |  | 106g | light olive |
| 2ig | slate tan | 110g | grayish olive |
|  |  | 112m | light olive gray |
| 2ml(m) |  |  |  |
| 3fe | silver gray | 63gm | light brownish gray |

TABLE 3

Cultural Characteristics of S. hygroscopicus Cultures

| Agar Medium |  | S. hygroscopic var. enhygrus | S. hygroscopicus CBS | S. endus NRRL 2339 |
|---|---|---|---|---|
| Peptone-iron | S | trace white | very slight trace white | pale gray white |
|  | R | yellow-tan | yellow-tan | yellow-tan |
|  | P | melanin negative | melanin negative | melanin negative |
| Calcium malate | S | trace white | trace white | trace white |
|  | R | colorless | colorless | colorless |
|  | P | none | none | none |
|  | O | malate not solubilized | malate not solubilized | malate not solubilized |
| Glucose asparagine | S | gray-white | gray-white | pale gray white |
|  | R | cream gray | cream | yellow-pink |
|  | P | none | none | none |
| Skim milk | S | gray-pink-white | gray-pink-white | fair gray-white |
|  | R | Yellow-pink-tan | yellow-pink-tan | yellow |
|  | P | yellow-pink | yellow-pink | yellow |
|  | O | Casein solubilized around growth | Casein solubilized around growth | casein solubilized |
| Tyrosine | S | gray | gray | gray-white |
|  | R | red-tan | red-tan | yellow |
|  | P | red-tan | red-tan | pale yellow |
|  | O | tyrosine solubilized | tyrosine solubilized | tyrosine solubilized |
| Xanthine | S | gray-white | trace gray-white | gray-white |
|  | R | pale yellow | pale yellow | yellow |
|  | P | none | none | none |
|  | O | xanthine not solubilized | xanthine not solubilized | xanthine not solubilized |
| Yeast extract malt extract | S | cream-gray-white with moist black patches | cream-gray-white with moist black patches | cream-gray-white |
|  | R | yellow-olive | yellow-olive | gray-brown |
|  | P | none | none | none |
| casein starch | S | gray | gray | gray |
|  | R | gray | gray | gray |
|  | P | none | none | none |
|  | O | starch hydrolyzed | starch hydrolyzed | starch hydrolyzed |
| Nutrient starch | S | white | white | white |
|  | R | cream | cream | cream |
|  | P | pale yellow | pale yellow | pale yellow |
|  | O | starch hydrol- | starch hydrol- | starch hydrol- |
| sabouroud's dextrose | S | yzed white | yzed white | yzed white |
|  | R | yellow-tan-orange | yellow-tan-orange | yellow |
|  | P | none | none | none |
| Bennett's | S | Heavy gray-white | Heavy gray-white | fair gray-white |
|  | R | yellow | yellow | yellow |
|  | P | none | none | tan |
| Czapek's sucrose | S | heavy gray | heavy gray | trace gray |
|  | R | gray | gray | gray |
|  | P | none | none | none |
| Maltose-tryptone | S | gray-white | gray-white | fair gray |
|  | R | yellow | yellow | cream |
|  | P | none | none | none |
| Peptone-yeast rate | S | no aerial growth | no aerial growth | white |
|  | O | compact to flocculent growth at base | compact to flocculent growth at base | compact to flocculent growth at base |
|  |  | nitrate reduced to nitrite | nitrate not reduced to nitrite | nitrate not reduced to nitrite |
| Nutrient nitrate | S | no surface growth | no surface growth | trace white aerial growth on surface pellicle |
|  | P | none | none | none |
|  | O | compact to flocculent growth at base | compact to flocculent growth at base | compact to flocculent growth at base |
|  |  | nitrate not reduced to nitrite | nitrate not reduced to nitrite | nitrate reduced to nitrite |
| Litmus milk | S | trace gray aerial growth on surface ring | tan surface ring | gray-white aerial growth on blue surface ring |
|  | O | peptonization complete. pH 6.5 | peptonization partial. pH 6.6 | peptonization complete. pH 7.75 |

S = Surface
R = Reverse
P = Pigment
O = Other characteristics

TABLE 4

Utilization of Carbon Compounds in the Synthetic Medium of Pridham and Gottlieb*

|  | S. hygroscopicus var. enhygrus | S. hygroscopicus CBS | S. endus NRRL 2339 |
|---|---|---|---|
| Control | − | (−) | (−) |
| 1. D-xylose | + | + | (+) |
| 2. L-arabinose | + | + | + |
| 3. rhamnose | + | + | + |
| 4. D-fructose | + | + | + |
| 5. D-galactose | + | + | + |
| 6. D-glucose | + | + | + |
| 7. D-mannose | + | + | + |
| 8. maltose | + | + | (−) |
| 9. sucrose | (+) | (+) | (−) |
| 10. lactose | + | + | (+) |
| 11. cellobiose | + | + | + |
| 12. raffinose | + | + | (−) |
| 13. dextrin | + | + | + |
| 14. inulin | (−) | (+) | (−) |
| 15. soluble starch | + | + | + |
| 16. glycerol | + | + | + |
| 17. dulcitol | (+) | (−) | (+) |
| 18. D-mannitol | + | + | + |
| 19. D-sorbitol | (+) | + | (−) |
| 20. D-inositol | (+) | (+) | (−) |
| 21. salicin | (+) | (+) | (−) |
| 22. phenol | − | − | − |
| 23. cresol | − | − | − |
| 24. Na formate | (−) | (−) | (−) |
| 25. Na oxalate | (−) | (+) | (−) |
| 26. Na tartrate | (−) | (+) | (−) |
| 27. Na salicylate | − | − | − |
| 28. Na acetate | (+) | + | (+) |
| 29. Na citrate | (+) | + | (+) |
| 30. Na succinate | (+) | + | (+) |

+ positive utilization
(+) positive utilization - slight growth
(−) slight growth - no utilization
− no growth
*Pridham, T. G., and D. Gottlieb. 1948. The utilization of carbon compounds by some Actinomycetales as an aid for species determination. J. Bacteriol. 56:107–114.

TABLE 5

Utilization of Carbon compounds in the Modified Medium of Pridham and Gottlieb*

| | S. hygroscopicus var. enhygrus | S. hygroscopicus CBS | S. endus NRRL 2339 |
|---|---|---|---|
| Negative control (Basal agar) | (−) | (−) | (−) |
| Positive control (Basal agar plus D-glucose) | + | + | + |
| L-arabinose | + | ++ | + |
| Sucrose | (−) | + | − |
| D-xylose | ++ | ++ | ± |
| Inositol | − | ± | − |
| D-mannitol | ++ | ++ | ++ |
| D-fructose | + | ++ | ++ |
| Rhamnose | ++ | ++ | ++ |
| Raffinose | ++ | ++ | − |
| Cellulose | + | + | − |

− Growth similar to or less than growth on basal medium without carbon compound.
++ Vegetative growth equal to or more than with glucose.
+ Vegative growth significantly better than on basal medium without carbon compound, but somewhat better than with glucose.
± Doubtful. Growth only slightly better than on basal medium without carbon compound and significantly less than with glucose.
*Shirling, E. B., and D. Gottlieb. 1966. Methods for characterization of Streptomyces species. International Journal of Systemic Bacteriology. 16:313–340.

The new compound of the invention is produced when the elaborating organism is grown in an aqueous nutrient medium under submerged aerobic conditions. It is to be understood also that for the preparation of limited amounts surface cultures and bottles can be employed. The organism is grown in a nutrient medium containing a carbon source, for example, an assimilable carbohydrate and a nitrogen source, for example, an assimilable nitrogen compound or proteinaceous material. Preferred carbon sources include glucose, brown sugar, sucrose, glycerol, starch, cornstarch, lactose, dextrin, molasses, and the like. Preferred nitrogen sources include corn steep liquor, yeast, autolyzed brewer's yeast with milk solids, soybean meal, cottonseed meal, cornmeal, milk solids, pancreatic digest of casein, distillers' solids, animal peptone liquors, meat and bone scraps, and the like. Combinations of these carbon and nitrogen sources can be used advantageously. Trace metals, for example, zinc, magnesium, manganese, cobalt, iron, and the like, need not be added to the fermentation media since tap water and unpurified ingredients are used as media components.

Production of the compound of the invention can be effected at any temperature conducive to satisfactory growth of the microorganism, for example, between about 18° and 40° C., and preferably between about 20° and 32° C. Ordinarily, optimum production of the compound is obtained in about 2 to 10 days. The medium normally remains basic during the fermentation. The final pH is dependent, in part, on the buffers present, if any, and in part on the initial pH of the culture medium.

When growth is carried out in large vessels and tanks, it is preferable to use the vegetative form, rather than the spore form, of the microorganism for inoculation to avoid a pronounced lag in the production of the new compound and the attendant inefficient utilization of the equipment. Accordingly, it is desirable to produce a vegetative inoculum in a nutrient broth culture by inoculating this broth culture with an aliquot from a soil or a slant culture. When a young, active vegetative inoculum has thus been secured, it is transferred aseptically to large vessels or tanks. The medium in which the vegetative inoculum is produced can be the same as, or different from, that utilized for the production of the new compound, as long as it is such that a good growth of the microorganism is obtained.

The new compound of the invention is an ampotheric, non-polyenic chemical compound. It is soluble at a concentration of less than 5 mg./ml. in water, acetone, ethyl acetate, methyl ethyl ketone, methylene chloride, chloroform, 1-butanol, and ether. It is soluble at a concentration of greater than 10 mg./ml. in methanol, ethanol, 1-propanol, glacial acetic acid, acetone-water (3:2) and water-saturated 1-butanol.

A variety of procedures can be employed in the isolation and purification of enhygrofungin, for example, solvent extraction, partition chromatography, silica gel chromatography. liquid-liquid distribution in a Craig apparatus, and crystallization from solvents. Solvent extraction procedures are preferred for commercial recovery inasmuch as they are less time consuming and less expensive.

A preferred procedure is to acidify the mycelium containing fermentation liquor to about pH 4–6 before filtration. When this is done the endomycin in the culture fluid is rendered insoluble so that such a small part of the antibiotic appears in the filtrate that the filtrate can be discarded without appreciable loss of endomycin. The filtration is preferably carried out in the presence of a diatomaceous earth filter aid which prevents clogging of the filter by the mycelium with a resulting greatly reduced rate of filtration.

The endomycin is extracted from the mycelium containing filter cake by means of a low molecular weight alcohol. Methanol or ethanol can be used in the anhydrous form but the propyl and butyl alcohols are poor solvents for endomycin unless they are mixed with water. The preferred extracting solvents are mixtures of the lower molecular weight aliphatic alcohols and water, containing from thirty to ninety percent of the alcohol and ten to seventy percent of water, the optimum mixture being dependent upon the particular alcohol used for extraction.

Enhygrofungin can be separated from the other components of the endomycin complex by partition chromatography using a solvent system consisting of methyl ethyl ketone:ethyl acetate:water (10:15:1.5). Fractions from the column can be analyzed by thin-layer chromatography using 10 × 20 cm. glass plates prepared with silica gel $HF_{254}$ (E. Merck, A.G.-Darmstadt, Germany) suspended in a solution of buffer salts (pH 6.7) composed of equal volumes of 0.2 M $Na_2HPO_4$ and 0.2 M $KH_2PO_4$. The plates are air-dried then activated at 130° C. for 2 hours prior to their use. Two ml. portions of fractions from the partition column are evaporated to dryness with a stream of $N_2$ and dissolved in 0.1 ml.

of methanol (20-fold concentration). Ten microliters is applied to the plate and developed with the solvent system methyl ethyl ketone:acetone:water (150:50:34). After development, the plates are air dried then sprayed with a freshly prepared mixture composed of anisaldehyde:95 percent ethanol:concentrated sulfuric acid:glacial acetic acid [0.5:9.0:0.5:0.1 (ml.)] and heated to 90°–100° C. for 5–10 minutes. Enhygrofungin (rf = approx. 0.23) appears as a dark blue spot.

Enhygrofungin can be recovered from partition column fractions containing only enhygrofungin, as shown by thin-layer chromatography, by mixing the fractions with Skellysolve B (isomeric hexanes); separating the phases and mixing the upper phase with water; again separating the phases; adjusting the aqueous phase to about pH 3.8 with concentrated hydrochloric acid; then mixing with water, filtering and cooling to about 5° C. to induce crystallization of enhygrofungin. The resulting crystals can be recrystallized from an acetone:water (3:2) solution which is adjusted to an acidic pH, as above, filtered and the filtrate stored at about 2° C. to induce crystallization of enhygrofungin.

An alternate procedure for separation of enhygrofungin from the other components of the endomycin complex is by subjecting a preparation of the endomycin complex to silica gel chromatography and crystallization. The endomycin complex preparation can be dissolved in methanol, mixed with silica gel, and the solvent removed by evaporation. The dried mixture is then poured into a layer of Skellysolve B which was previously introduced into a column of silica gel. The column can be developed with a solvent system consisting of methyl ethyl ketone:acetone:water (150:50:28) and fractions containing only enhygrofungin, as determined by thin-layer chromatography, isolated. These fractions can be freeze-dried, and the substantially pure freeze-dried preparation of enhygrofungin dissolved in acetone:water (3:1), which is then mixed with water and refrigerated to induce crystallization of enhygrofungin.

Enhygrofungin can be purified by successive transfers from protonated to non-protonated forms and vice versa, especially with other types of treatments intervening as, for example, solvent extractions and washings, chromatography, and fractional liquid-liquid extraction. In this manner, salts of enhygrofungin can be employed to isolate or upgrade the antibiotic. For example, the antibiotic can be converted to an insoluble salt, such as the picrate, which can be subjected to purification procedures and then used to regenerate the antibiotic. Or the antibiotic can be converted to a water-soluble salt, such as the hydrochloride or sulfate, and the aqueous solution of the salt extracted with various water-immiscible solvents before regenerating the antibiotic.

Since enhygrofungin is an ampotheric substance, it forms salts with acids, alkali metals, alkaline earth metals, and amines. Metal salts can be prepared by dissolving enhygrofungin in water, adding a dilute metal base until the pH of the solution is about 7 to 8, and freeze-drying the solution to provide a dried residue consisting of the enhygrofungin metal salt. Enhygrofungin metal salts include the sodium, potassium, and calcium salts. Amine salts of enhygrofungin, including those with organic bases such as primary, secondary, and tertiary mono-, di-, and polyamines also can be formed using the above-described or other commonly employed procedures. Other salts are obtained with therapeutically effective bases which impart additional therapeutic effects thereto. Such bases are, for example, the purine bases such as theophyllin, theobromin, caffein, or derivatives of such purine bases; antihistaminic bases which are capable of forming salts with weak acids; pyridine compounds such as nicotinic acid amide, isonicotinic acid hydrazide, and the like; phenylalkylamines such as adrenalin, ephedrin, and the like; choline, and others.

Acid salts of enhygrofungin can be made by neutralizing enhygrofungin with the appropriate acid to below about pH 7.0, and advantageously to about pH 2 to pH 6. Suitable acids for this purpose include hydrochloric, sulfuric, phosphoric, and the like. Acid and base salts of enhygrofungin can be used for the same biological purposes as the parent compound.

Enhygrofungin is active against *Bacillus subtilis* and can be used to minimize or prevent odor in fish and fish crates caused by this organism. It also can be used for treating breeding places of silkworms to prevent or minimize infections caused by *B. subtilis*. Also, since enhygrofungin is active against *Cryptococcus neoformans*, it can be used to treat pigeon roosts to inhibit this fungus which has been found in pigeon droppings. (J. Am. Med. Assoc., Vo. 191, No. 4, Jan. 25, 1965, pp. 269–274). Also, the novel antibiotic of the invention can be used to swab laboratory benches and equipment in a mycological laboratory.

Hereinafter are described non-limiting examples of the process and products of the present invention. All percentages are by weight and all solvent mixture proportions are by volume unless otherwise noted.

EXAMPLE 1

A. Fermentation

A soil stock of *Streptomyces hygroscopicus* var. *enhygrus*, NRRL 3664, is used to inoculate a series of 500-ml. Erlenmeyer flasks, each containing 100 ml. of sterile seed medium consisting of the following ingredients:

| | |
|---|---|
| Glucose monohydrate | 25 g./l. |
| Pharmamedia* | 25 g./l. |
| Tap water | Balance |

*Pharmamedia is an industrial grade of cottonseed flour produced by Trader's Oil Mill Company, Fort Worth, Texas.

The flasks are grown for 3 days at 28° C. on a Gump rotary shaker operating at 250 r.p.m.

Seed inoculum, described above, is used to inoculate a series of 500-ml. Erlenmeyer flasks, each containing 100 ml. of sterile fermentation medium. The inoculation rate is 5 ml. of seed inoculum/100 ml. of fermentation medium. The fermentation medium consists of the following ingredients:

| | |
|---|---|
| Glucose monohydrate | 60 g./l. |
| Hi-starch* | 20 g./l. |
| Calcium carbonate | 4 g./l. |
| Sodium nitrate | 4 g./l. |
| Pharmamedia | 20 g./l. |
| Tap water q.s. | Balance |

*Hi-starch is a corn flour produced by Illinois Cereal Mills, Paris, Illinois.

The pH of the fermentation medium is adjusted to 7.2 with an aqueous solution of sodium hydroxide before sterilization.

The inoculated fermentation flasks, described above, are incubated for 6 days at a temperature of 28° C. on a Gump rotary shaker operating at 250 r.p.m.

The antibiotic titer of the fermentation beers is monitered by use of a disc plate assay using the microorganism *Saccharomyces cerevisiae*. *S. cerevisiae* is inoculated into the assay agar of the following composition:

| | |
|---|---|
| Dextrose | 10.0 g./l. |
| Yeast extract | 2.5 g./l. |
| $KH_2PO_4$ | 1.0 g./l. |
| Agar | 17.5 g./l. |
| pH | 5.65 ± .1 |

Petri dishes are poured and a 12.7 mm. paper disc is placed upon the solidified agar. An 0.08 ml. of aliquot of the enhygrofungin preparation is applied, and the zone of inhibition of growth is determined after incubation for 18 hrs. at 28° C.

The antibiotic activity of the fermentation beer is expressed in terms of endits. In order to convert endits to micrograms, the following formula is used: 1 mcg. = 4 endits. A controlled fermentation yield as assayed by *S. cerevisiae*, as described above, ranges from 4 to 5 mg. of antibiotic/ml.

It is noted that this assay represents the sum of the active endomycin complex components present. Assays for enhygrofungin are not specific until the enhygrofungin is separated from the other components by partition chromatography, as described above and infra.

B. Recovery

The whole beer from an enhygrofungin fermentation, as described above, (2,800 ml. assaying 7,700 endits/ml. against *S. cerevisiae*) is adjusted to pH 4.5 with hydrochloric acid. The acidified beer is then filtered using diatomaceous earth as filter aid. The mycelial cake is extracted 3 times with 700-ml. each of 1-butanol saturated with water at 50° C. The butanol is diluted with 2 volumes of Skellysolve B. The oily precipitate which forms is collected, dissolved in 80 percent ethanol and evaporated under vacuum to dryness; yield 1.73 g. assaying 2,100 endits/mg. against *S. cerevisiae*.

C. Purification

An impure preparation containing enhygrofungin, obtained as described above, (75 g. assaying 250 mcg./mg. against *S. cerevisiae*) is subjected to partition chromatography. The partition column is prepared as follows:

Dicalite 4200 (3,000 g., Great Lakes Carbon Corporation) is mixed with approximately 35 liters of upper phase solvent and 1,200 ml. of lower phase solvent. This upper phase solvent and lower phase solvent is prepared by mixing the following solvents and separating the phases: methyl ethyl ketone 1,000 parts, ethyl acetate 500 parts, water 150 parts. The mixture is poured into a 10 cm. diameter (ID) glass column and the Dicalite is packed to a constant height (137 cm) with down-flowing upper phase solvent. The solvent level is drained to about 1 inch above the packed column bed.

The enhygrofungin preparation described above, (75 g., 250 mcg./mg.) is dissolved in 120 ml. of lower phase solvent. This solution is mixed with 240 g. of Dicalite 4200 and enough upper phase solvent to make the mixture fluid. This mixture is poured onto the top of the prepared column bed and the solvent level is drained to the level of the newly added Dicalite mixture. Fresh upper phase solvent is added and the column is developed at a flow rate of 16 liters/hour. Four-liter fractions are collected after the introduction of the load. Column fractions and preparations are analyzed by thin-layer chromatography, prepared as described above. Analyses of the column fractions by thin-layer chromatography show that fractions 9 through 23 contain the major share of purified enhygrofungin. These fractions are combined (60 liters) and mixed with 30 liters of Skellysolve B. The phases are separated and the upper phase is mixed with 500 ml. of water. The phases are again separated and the washed upper phase is discarded, but the aqueous phases are combined (4,300 ml.), adjusted to pH 3.8 with concentrated hydrochloric acid (0.3 ml.), mixed with water (½ volume, 2,150 ml.), filtered, cooled, and held at a temperature of 5° C. until crystallization is complete. Enhygrofungin crystals are removed by filtration, washed with water and dried in vacuo to a constant weight; yield, 10.5 g. of white enhygrofungin crystals.

A portion of the enhygrofungin crystals, obtained above, (8.64 g.) are recrystallized by dissolving in 165 ml. of acetone:water (3:2) and the solution is adjusted to pH 4.0 with hydrochloric acid, then filtered. The clear filtrate is mixed with 1,500 ml. of filtered water until crystallization of enhygrofungin crystals begins. The mixture is then stored overnight at 2° C. The enhygrofungin crystals are removed by filtration, washed with water (25 ml.), and dried in vacuo to a constant weight; yield, 8.3 g. of highly pure enhygrofungin crystals.

Example 2

Enhygrofungin is recovered from a preparation of the endomycin complex using the following silica gel chromatography procedure. Silica gel (Merck A.G., Darmstadt, 5 kg.) is mixed with Skellysolve B, poured into a 10 cm. (ID) glass chromatography tube, and packed to a constant height (122 cm.) with flowing Skellysolve B. A preparation of endomycin complex (25 g.), prepared as described in Example 1, Parts A and B, is dissolved in 100 ml. of methanol, and mixed with 200 g. of silica gel. The solvent is removed by evaporation with circulating air. The resulting dried mixture is poured into a layer of Skellysolve B remaining on top of the silica gel column bed. The level of Skellysolve B is lowered to the level of the load, and fresh solvent consisting of methyl ethyl ketone:acetone:water (150:50:28) is introduced and used to develop the column at a flow rate of 12 liters/hour. Fractions (4 liters) are collected. Fractions are analyzed by thin-layer chromatography, as described previously, except with the solvent system methyl ethyl ketone:acetone:water (150:50:32). Fractions 16 through 25 contain substantially pure enhygrofungin. These fractions are combined, concentrated in vacuo to an aqueous pure solution which is freeze-dried; yield, 12.5 g. of substantially pure enhygrofungin. A portion of this preparation (50 mg.) is dissolved in 8 ml. of acetone:water (3:1), mixed with 58 ml. of water, and refrigerated until crystallization is complete. The crystals of enhygrofungin are removed by filtration, washed with water, and dried in vacuo to a constant weight; yield, 39 mg. of enhygrofungin assaying 930 mcg./mg. against *S. cerevisiae*.

Example 3

The fermentation broth from an *S. endus* fermentation, as disclosed in Example 3 of U.S. Pat. No. 2,746,902, can be used as the starting material to prepare enhygrofungin by the procedure of Example 1, supra.

We claim:

1. Antibiotic enhygrofungin which is active against various Gram-positive bacteria and fungi, and, which, in its essentially pure crystalline form has
   a. white crystals
   b. an elemental analysis: C, 60.95; H, 9.00; N, 4.01; O, 26.46:
   c. an optical rotation $[\alpha]_D^{25} = +20$ (c, 0.5 percent in dimethylformamide);
   d. a melting point of about 119.3° C.;
   e. solubilities as follows: soluble at a level of less than 5 mg./ml. in water, acetone, ethyl acetate, methyl ethyl ketone, methylene chloride, chloroform, 1-butanol, and ether; soluble at a concentration greater than 10 mg./ml. in methanol, ethanol, n-propanol, glacial acetic acid, acetone-water (3:2), and water saturated 1-butanol;
   f. a characteristic infrared absorption spectrum as shown in FIG. 1 of the accompanying drawing; and,
   g. a characteristic paper chromatographic pattern as shown in FIG. 2 of the accompanying drawing, and being substantially free of other components in the endomycin complex.

2. A compound as defined in claim 1, enhygrofungin, in its essentially pure form.

3. A compound as defined in claim 1, enhygrofungin, in its essentially pure crystalline form.

4. A compound selected from the group consisting of enhygrofungin, according to claim 1, and a salt thereof with an alkali metal, an alkaline earth metal, or an amine.

5. Acid addition salt of enhygrofungin, the compound defined in claim 1.

6. A process, which comprises cultivating *Streptomyces hygroscopicus* var. *enhygrus* in an aqueous nutrient medium containing a source of assimilable carbohydrate and assimilable nitrogen, under aerobic conditions, until substantial activity against *Saccharomyces cerevisiae* is imparted to said medium by the production of endomycin complex, and isolating enhygrofungin substantially free of other components of the endomycin complex.

7. A process, according to claim 6, in which the isolation comprises filtering the medium, extracting the endomycin complex with a solvent for endomycin, subjecting said extracted endomycin complex to partition chromatography, and isolating pure enhygrofungin from fractions obtained from said partition chromatography.

* * * * *